United States Patent
Chu et al.

(10) Patent No.: US 8,319,739 B2
(45) Date of Patent: Nov. 27, 2012

(54) FORCE-SENSING MODULES FOR LIGHT SENSITIVE SCREENS

(75) Inventors: Chen-Chi Chu, Taipei (TW); Naejye Hwang, Hsinchu (TW)

(73) Assignee: Integrated Digital Technologies, Inc., Hsinchu Science Park (TW)

( * ) Notice: Subject to any disclaimer, the term of this patent is extended or adjusted under 35 U.S.C. 154(b) by 772 days.

(21) Appl. No.: 12/403,415

(22) Filed: Mar. 13, 2009

(65) Prior Publication Data
US 2010/0156852 A1    Jun. 24, 2010

(30) Foreign Application Priority Data
Dec. 23, 2008  (TW) ................................ 97150334 A

(51) Int. Cl.
*G06F 3/041*    (2006.01)
(52) U.S. Cl. .......................................................... 345/173
(58) Field of Classification Search .................. None
See application file for complete search history.

(56) References Cited

U.S. PATENT DOCUMENTS

| 6,961,015 | B2 * | 11/2005 | Kernahan et al. | ............. | 341/165 |
| 2007/0236466 | A1 | 10/2007 | Hotelling | | |
| 2008/0048997 | A1 * | 2/2008 | Gillespie et al. | ............. | 345/174 |
| 2008/0162996 | A1 | 7/2008 | Krah et al. | | |
| 2008/0165134 | A1 | 7/2008 | Krah | | |

FOREIGN PATENT DOCUMENTS

| JP | 52-007629 A | 1/1977 |
| JP | 1-96040 U | 6/1989 |
| JP | 05-002447 A | 1/1993 |
| JP | 09-035570 A | 2/1997 |
| JP | 2004-127073 | 4/2004 |
| JP | 2004-210124 A | 7/2004 |
| JP | 2006-163618 A | 6/2006 |
| JP | 2008-287575 A | 11/2008 |

OTHER PUBLICATIONS

Office Action in Japanese Patent Application No. 2009-210087, dated Nov. 23, 2011; 2 sheets.
Office Action in Taiwan Application No. 097150334, issued on Feb. 14, 2011; 6 sheets.
Office Action for Japanese Application No. 2009-210087 dated May 29, 2012.

* cited by examiner

*Primary Examiner* — Paul Huber
(74) *Attorney, Agent, or Firm* — Alston & Bird LLP

(57) ABSTRACT

A light sensitive screen includes at least one sensing element each being configured to detect a force applied to a position of the light sensitive screen and generate an electrical signal when a force is detected, and a sensor module configured to receive and process the electrical signal from the at least one sensing element. The sensor module may amplify the electrical signal from one of the at least one sensing element and generate an amplified signal, compare the amplified signal with a threshold and generate a comparing result, and generate a digital signal based on the comparing result, the digital signal including information as to whether the position of the light sensitive screen is touched.

6 Claims, 13 Drawing Sheets

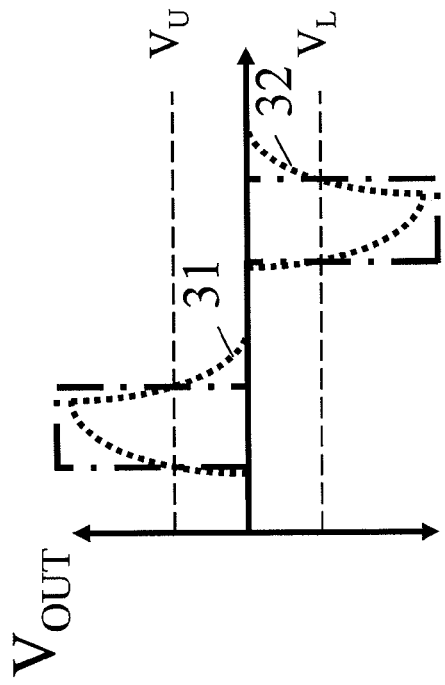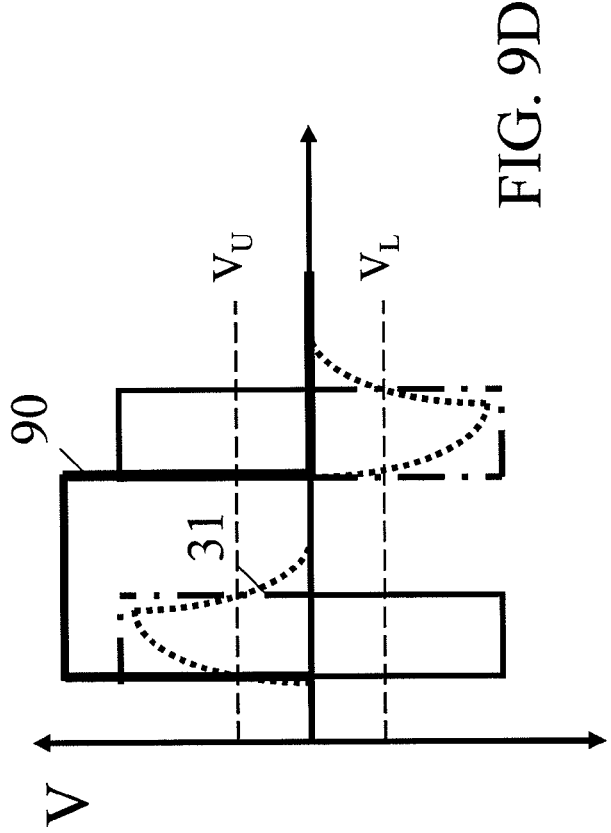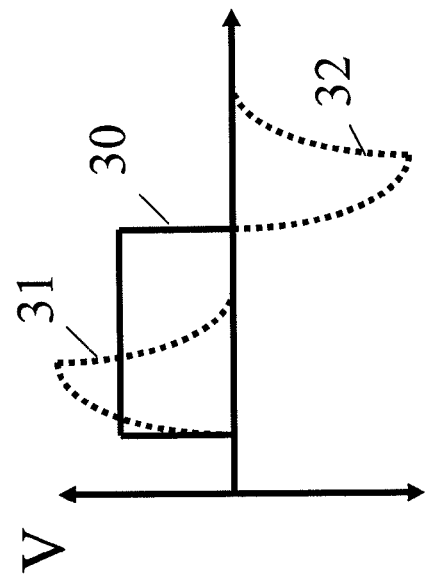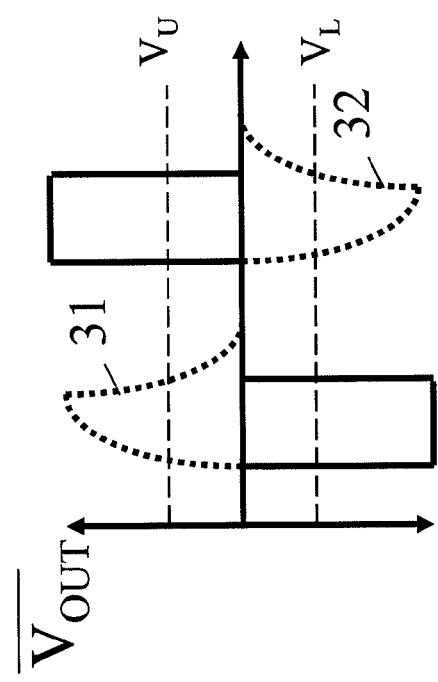
FIG. 9A
FIG. 9B
FIG. 9C
FIG. 9D

FORCE-SENSING MODULES FOR LIGHT SENSITIVE SCREENS

BACKGROUND OF THE INVENTION

The present invention relates to touch panels. More particularly, the present invention relates to force-sensing modules for light sensitive screens.

Touch panels or touch screens capable of providing user interface and user interaction have been widely used in electronic products such as personal computers, cellular phones, personal digital assistants and the like. In operation, it may be necessary for a touch panel to detect a touched position thereon. To detect whether a position is touched, a conventional method called "Carroll method" disclosed in U.S. Pat. No. 4,267,443 to Carroll et al. may be generally employed. In the Carroll method, an optical matrix comprising a plurality of light emitting elements such as LEDs and a matrix of light receiving elements may be arranged on a front surface of a screen. A position at the front surface of the screen where a light beam emitted from a light emitting element may be blocked by the touch of a pen or finger may be detected by the light receiving elements.

Some conventional touch panels or light sensitive screens may detect a change in brightness at a position of the panel due to an approaching or leaving force source and, based on the brightness change, identify whether the position is pressed or touched. For example, an approaching finger or pen may cast a shadow over the position and cause a change in brightness. However, it may be difficult to distinguish a "real" touch that the finger or pen is actually pressed on the position from a "quasi" touch that the approaching finger or pen, though cause a significant brightness change for being very close to the position, does not physically touch or contact the position. A misunderstanding of the touch status may result in malfunction of the panels or undesired operation on the panels.

BRIEF SUMMARY OF THE INVENTION

Examples of the present invention may provide a light sensitive screen comprising at least one sensing element each being configured to detect a force applied to a position of the light sensitive screen and generate an electrical signal when a force is detected, the electrical signal including a positive half and a negative half, and a sensor module configured to receive and process the electrical signal from the at least one sensing element, the sensor module comprising an amplifier configured to amplify the electrical signal from one of the at least one sensing element and generate an amplified signal, a comparator configured to compare one of the positive half and the negative half with a threshold and generate a first voltage signal and a second voltage signal, the first voltage signal and the second voltage having the same amplitude with different signs, and a digitizer configured to generate a digital signal based on the first voltage signal and the second voltage signal, the digital signal including information as to whether the position of the light sensitive screen is touched.

Some examples of the present invention may provide a light sensitive screen comprising at least one sensing element each being configured to detect a force applied to a position of the light sensitive screen and generate an electrical signal when a force is detected, and a sensor module configured to receive and process the electrical signal from the at least one sensing element, the sensor module comprising an amplifier configured to amplify the electrical signal from one of the at least one sensing element and generate an amplified signal, a rectifier configured to convert the amplified signal into a direct-current (DC) signal including a first positive half and a second positive half, a trigger configured to detect an edge each of the first positive half and the second positive half, and generate a first pulse signal and a second pulse signal for the first positive half and the second positive half, respectively, and a digitizer configured to generate a digital signal based on the first pulse signal and the second pulse signal, the digital signal including information as to whether the position of the light sensitive screen is touched.

Examples of the present invention may further provide a light sensitive screen comprising at least one sensing element each being configured to detect a force applied to a position of the light sensitive screen and generate an electrical signal when a force is detected, the electrical signal including a positive half and a negative half, and a sensor module configured to receive and process the electrical signal from the at least one sensing element, the sensor module comprising an amplifier configured to amplify the electrical signal from one of the at least one sensing element and generate an amplified signal, an integrator to integrate the amplified signal from the amplifier and generate an integrated signal, a comparator configured to compare the integrated signal with a threshold, and a digitizer configured to generate a digital signal based on a result of comparison from the comparator, the digital signal including information as to whether the position of the light sensitive screen is touched.

Examples of the present invention may also provide a light sensitive screen comprising at least one sensing element each being configured to detect a force applied to a position of the light sensitive screen and generate an electrical signal when a force is detected, and a sensor module configured to receive and process the electrical signal from the at least one sensing element, the sensor module comprising an amplifier configured to amplify the electrical signal from one of the at least one sensing element and generate an amplified signal, a rectifier configured to convert the amplified signal into a direct-current (DC) signal including a first positive half and a second positive half, a peak detector configured to detect a first peak value of the first positive half and a second peak value of the second positive half, and a digitizer configured to generate a digital signal based on the first peak value and the second peak value, the digital signal including information as to whether the position of the light sensitive screen is touched.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings:

FIG. 9A is a waveform diagram illustrating exemplary waveforms of an input force and an amplified electrical signal;

FIGS. 9B and 9C are waveform diagrams illustrating exemplary waveforms of output voltages of a comparator illustrated in FIG. 8B; and FIG. 9D is a waveform diagram illustrating an exemplary waveform of an output of a digitizer illustrated in FIG. 8B.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1:
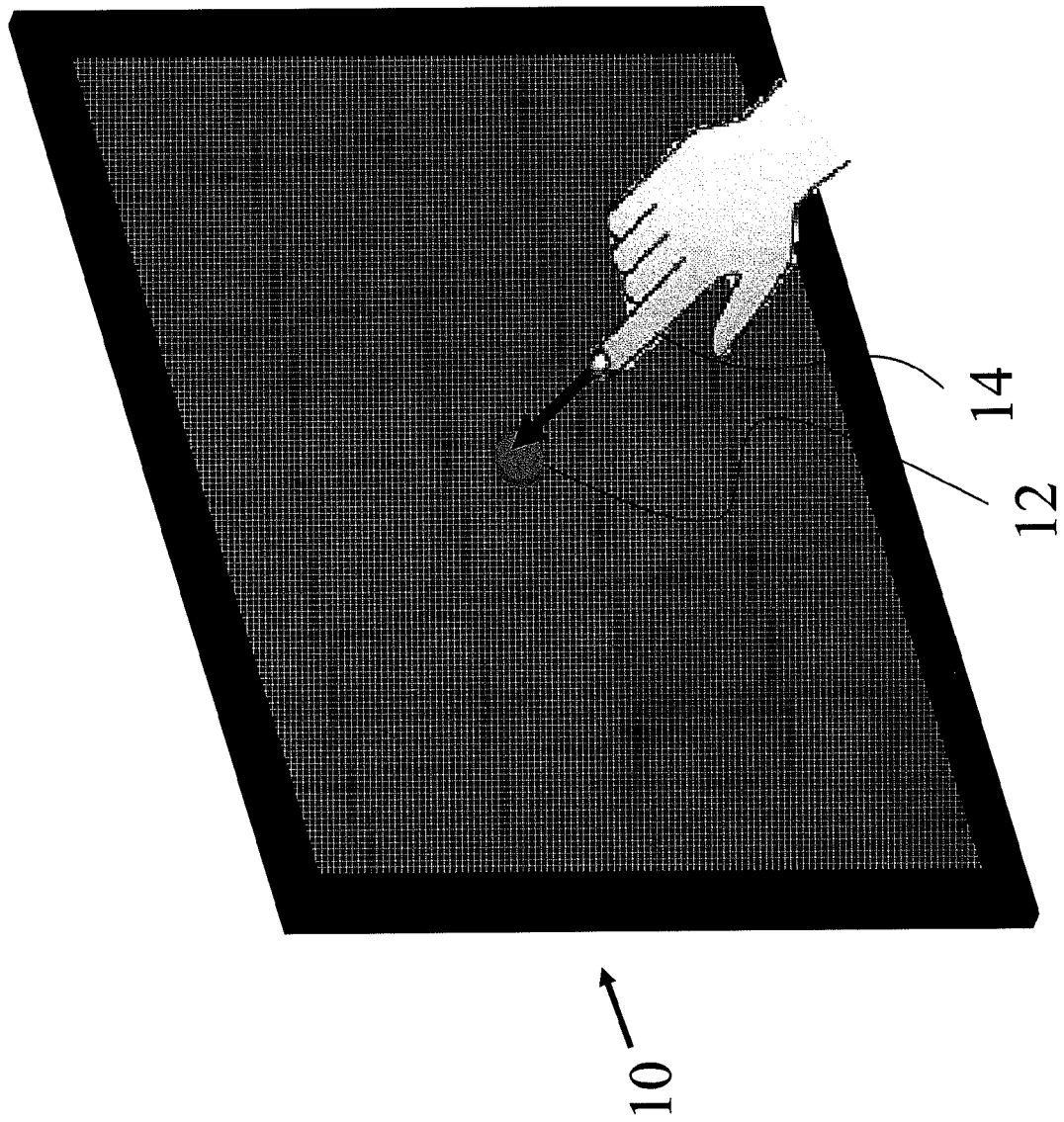
FIG. 1 is a schematic diagram illustrating an exemplary light sensitive screen in operation.

FIG. 1 is a schematic diagram illustrating an exemplary light sensitive screen 10 in operation. Referring to FIG. 1, the light sensitive screen or touch panel 10 may include a sensing element 12. In one example, the sensing element 12 may include one of a piezoelectric element based on the piezoelectric effect and a piezoresistive element based on the piezoresistive effect. The piezoelectric effect may refer to the ability of piezoelectric materials, such as crystals and certain ceramics, to generate an electric potential in response to applied mechanical stress. The piezoresistive effect, however, may cause a change in electrical resistance due to applied mechanical stress. Accordingly, the sensing element 12 may generate an electrical signal when an applied force is detected.

In operation, as a force source 14 such as a finger or a pen-like object touches a surface of the light sensitive screen 10, force from the force source 14 may cause mechanical stress on the light sensitive screen 10 and in turn the sensing element 12. In response, the sensing element 12 may generate an electrical signal, either a voltage signal or a current signal, which may then be processed in order to identify whether the force is significant and in turn whether the light sensitive screen 10 is touched. In one example, the sensing element 12 may be disposed at one of a front surface and a back surface of the light sensitive screen 10. In another example, one or more sensing element 12 may be used for the light sensitive screen 10.

Figure 2A:
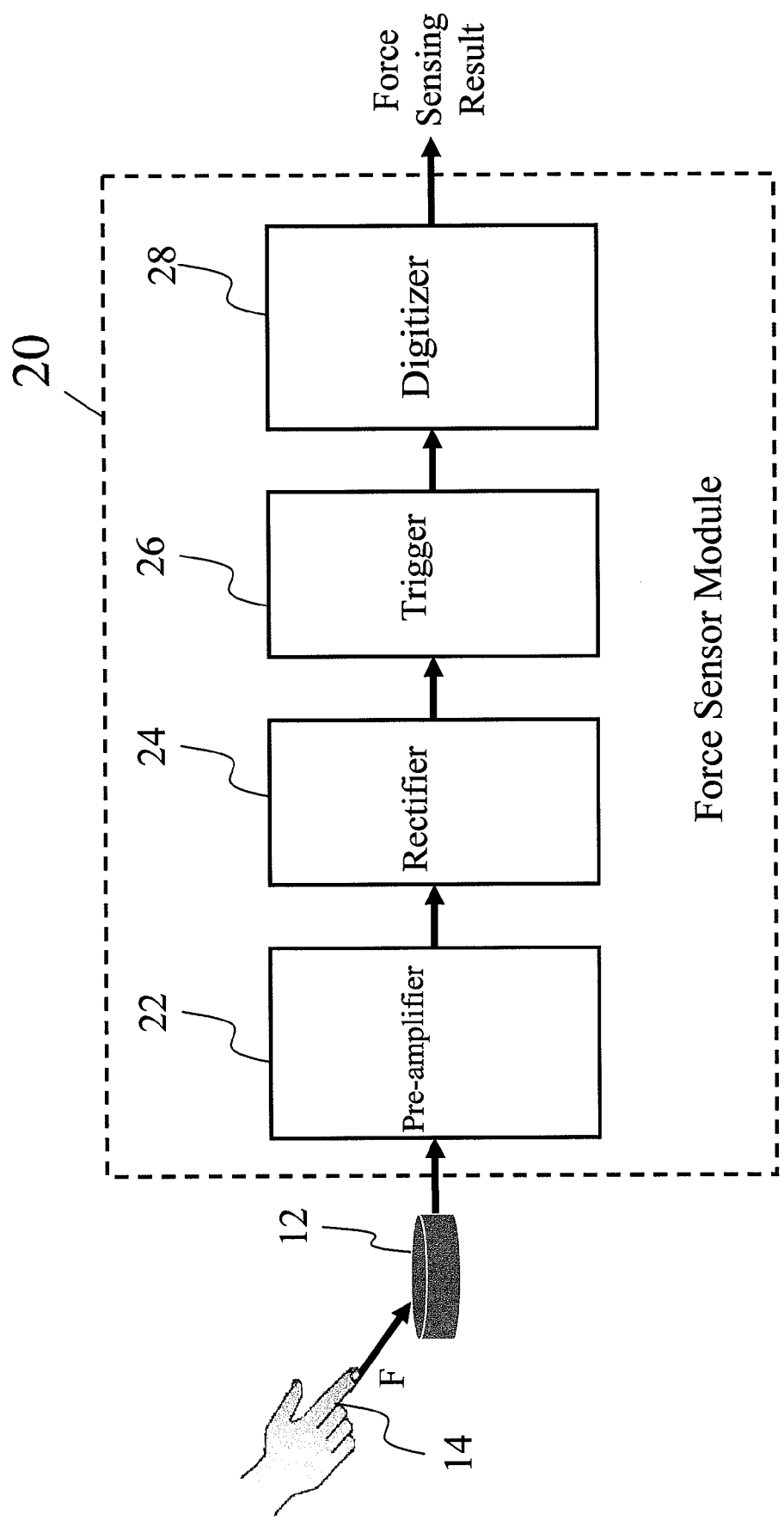
FIG. 2A is a block diagram illustrating a force sensor module according to an example of the present invention.

FIG. 2A is a block diagram illustrating a force sensor module 20 according to an example of the present invention. Referring to FIG. 2A, the force sensor module 20 may include a pre-amplifier 22, a rectifier 24, a trigger 26 and a digitizer 28. The pre-amplifier 22 may be configured to amplify an electrical signal from the sensing element 12. The rectifier 24 may be configured to convert an amplified electrical signal from the pre-amplifier 22. In one example, the rectifier 24 may include a full-wave rectifier capable of converting an alternating-current (AC) signal into a direct-current (DC) signal. The trigger 26 in one example may include a rising-edge trigger capable of detecting a rising edge of a rectified signal from the rectifier 24.

Figure 2B:
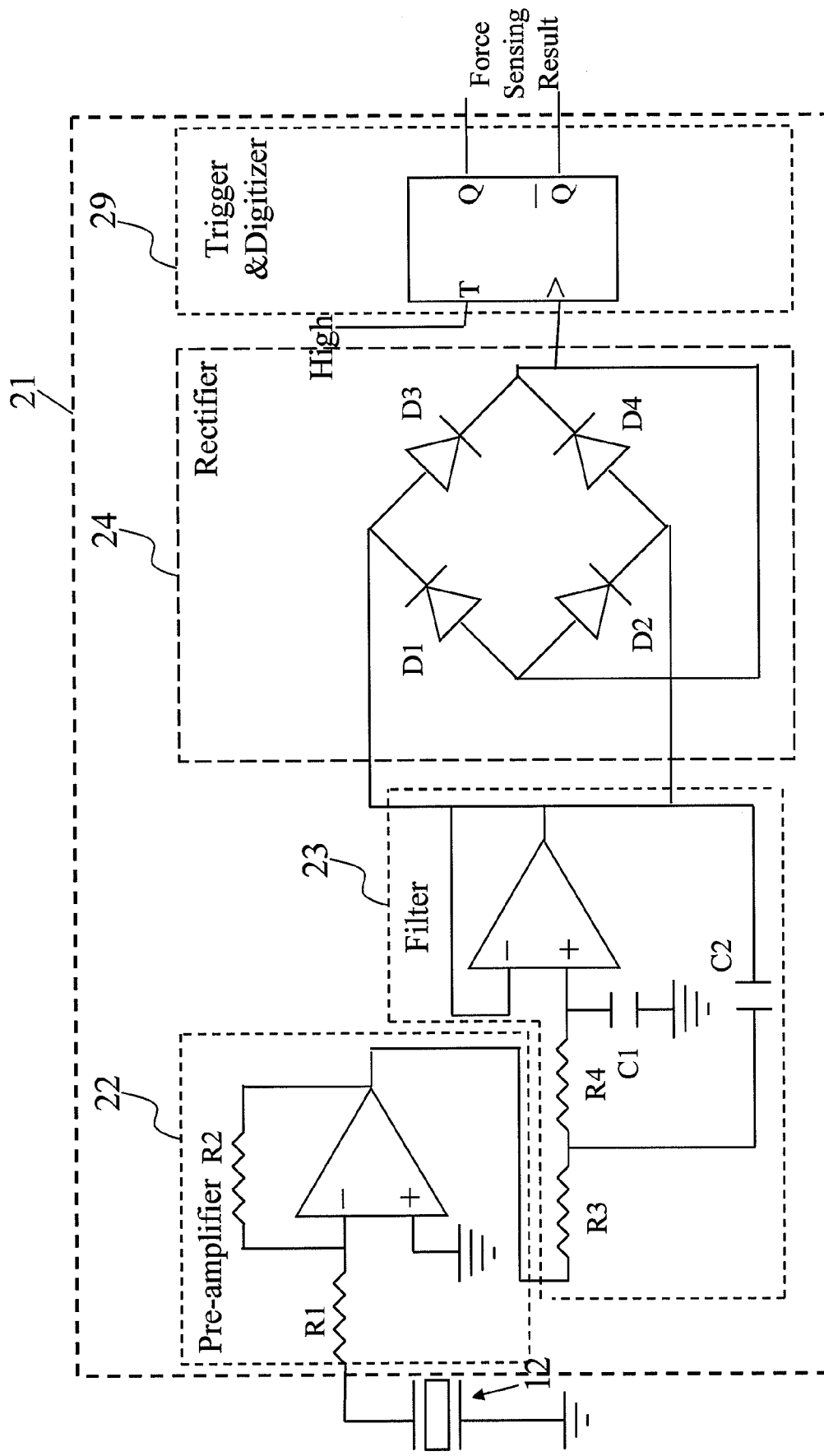
FIG. 2B is a circuit diagram illustrating a force sensor module according to another example of the present invention.

FIG. 2B is a circuit diagram illustrating a force sensor module 21 according to another example of the present invention. Referring to FIG. 2B, the force sensor module 21 may be similar to the force sensor module 20 described and illustrated with reference to FIG. 2A except that, for example, a trigger-and-digitizer module 29 replaces the trigger 26 and the digitizer 28 illustrated in FIG. 2A. The trigger-and-digitizer module 29 may be configured to convert a rectified signal from the rectifier 24 into a digitized signal, which may serve as an output "force sensing result" of the force sensor module 21. The force sensor module 21 may further include a filter 23 configured to attenuate or reduce an undesired component such as noise in an amplified signal from the pre-amplifier 22.

In the present example, the pre-amplifier 22 and filter 23 may each include at least one operating amplifier. Furthermore, the trigger-and-digitizer module 29 may include a flip-flop including an input "T" coupled with a logic high signal "High". The output ports Q and $\overline{Q}$ of the trigger-and-digitizer may respectively generate a logic high signal and logic low signal, and vice versa, depending on the output of the rectifier 24, i.e., the output of diode D3 or D4.

Figure 3A:
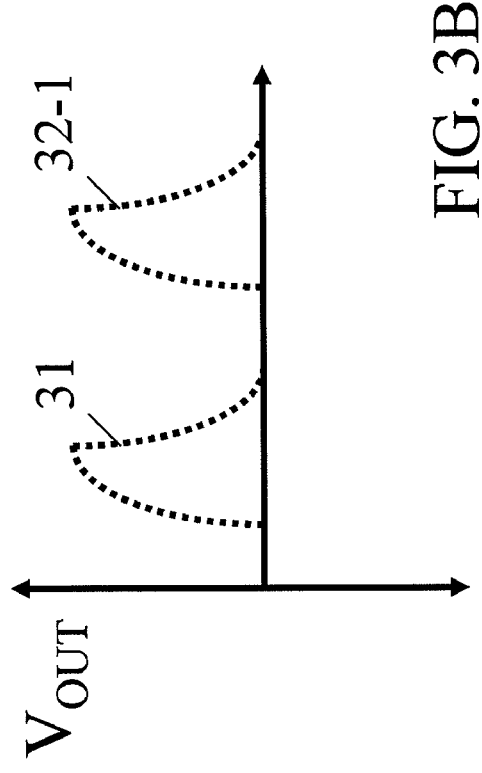
FIG. 3A is a waveform diagram illustrating exemplary waveforms of an input force and an amplified electrical signal.

FIG. 3A is a waveform diagram illustrating exemplary waveforms of an input force and an amplified electrical signal. Referring to FIG. 3A, the input force applied to a screen from a force source may be represented by a square-wave shape 30. The input force may be detected by the sensing element 12, which in turn may generate an electrical signal. The electrical signal may be an AC signal including a positive first half 31 and a negative second half 32. Moreover, the electrical signal may then be amplified and filtered, resulting in the amplified electrical signal. The waveform of the amplified electrical signal may include the first half 31, which may represent that the input force is exerted on the screen, and the second half 32, which may represent that the input force is released from the screen.

Figure 3C:
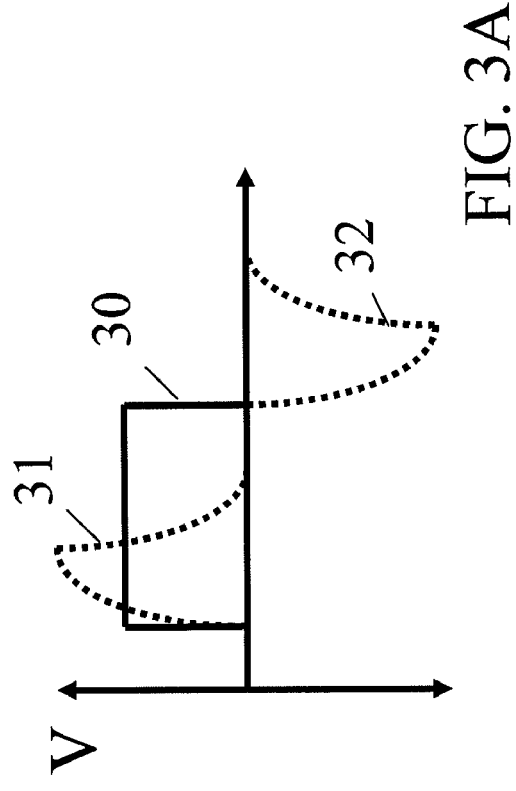
FIG. 3C is a diagram illustrating exemplary pulses from a trigger illustrated in FIG. 2B.
Figure 3B:
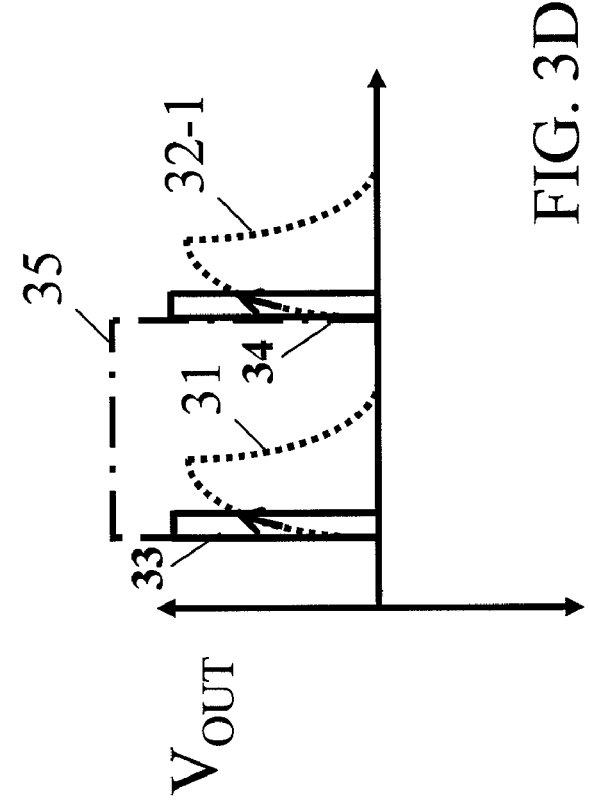
FIG. 3B is a waveform diagram illustrating an exemplary waveform of a rectified signal from a rectifier illustrated in FIG. 2B.

FIG. 3B is a waveform diagram illustrating an exemplary waveform of a rectified signal from the rectifier module 24 illustrated in FIG. 2B. Referring to FIG. 3B, the amplified electrical signal may be converted from an AC signal into a DC signal by the rectifier 24. For example, the negative second half 32 may be converted into a positive one 32-1 by rectification.

FIG. 3C is a diagram illustrating exemplary pulses from the trigger 26 illustrated in FIG. 2A. Referring to FIG. 3C, the trigger 26 may be configured to fetch rising edges of the rectified signal and generate pulse signals 33 and 34 when the rising edges are detected.

Figure 3D:
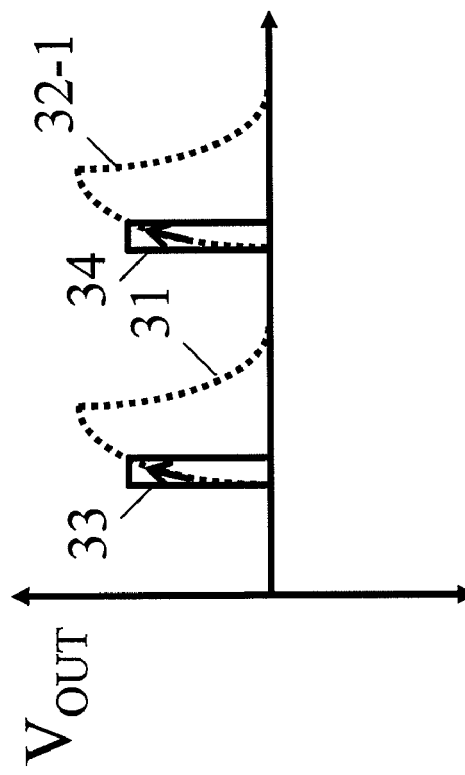
FIG. 3D is a waveform diagram illustrating an exemplary waveform of an output from a digitizer illustrated in FIG. 2B.

FIG. 3D is a waveform diagram illustrating an exemplary waveform of an output 35 from the digitizer 28 illustrated in FIG. 2A. Referring to FIG. 3D, the digitizer 28 may latch the pulse signals 33 and 34 and generate the output 35 as a force sensing result. The output 35 from the digitizer 28 may have a square-wave shape and may include an active period spanning between the rising edges.

Figure 4A:
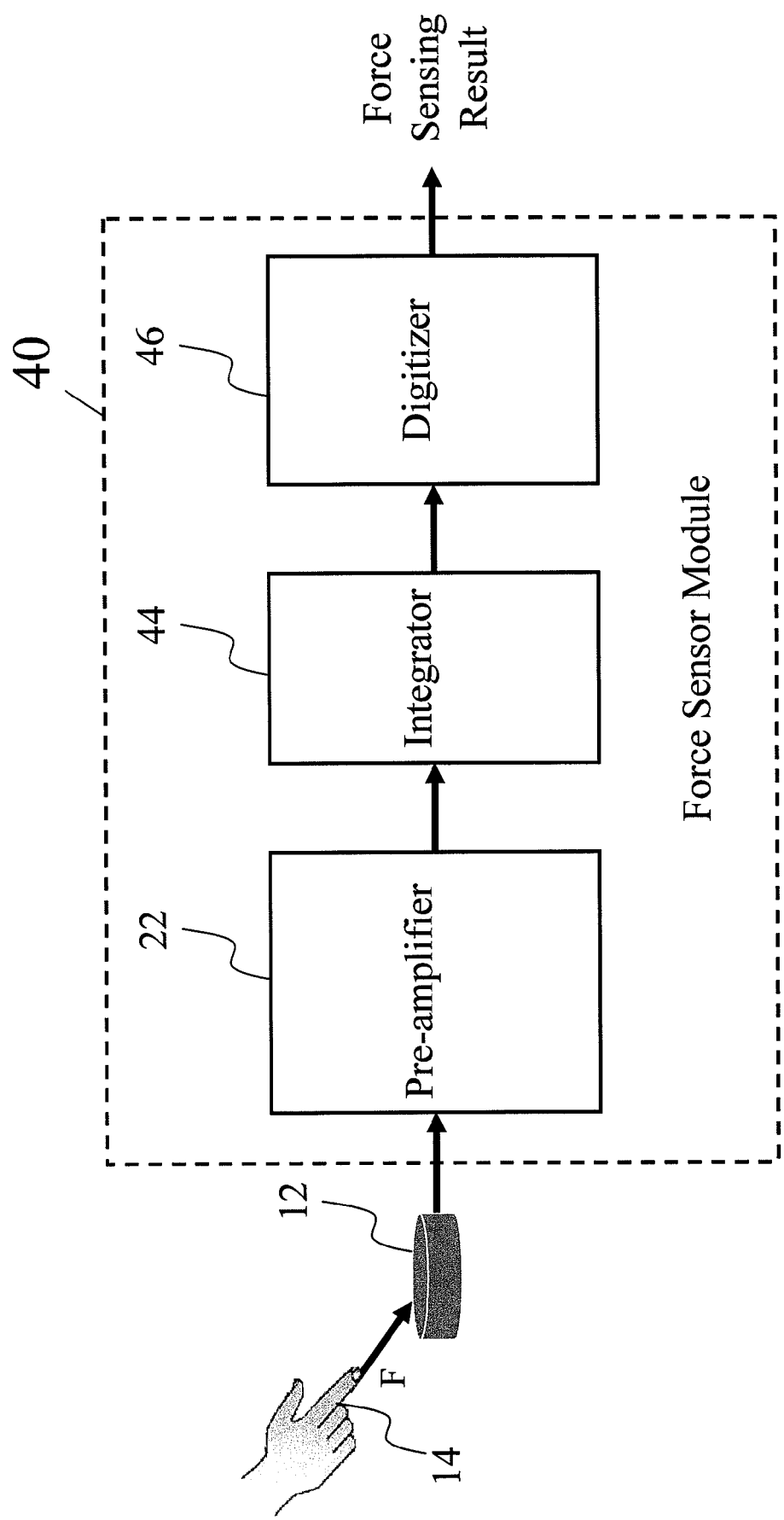
FIG. 4A is a block diagram illustrating a force sensor module according to yet another example of the present invention.
Figure 5A:
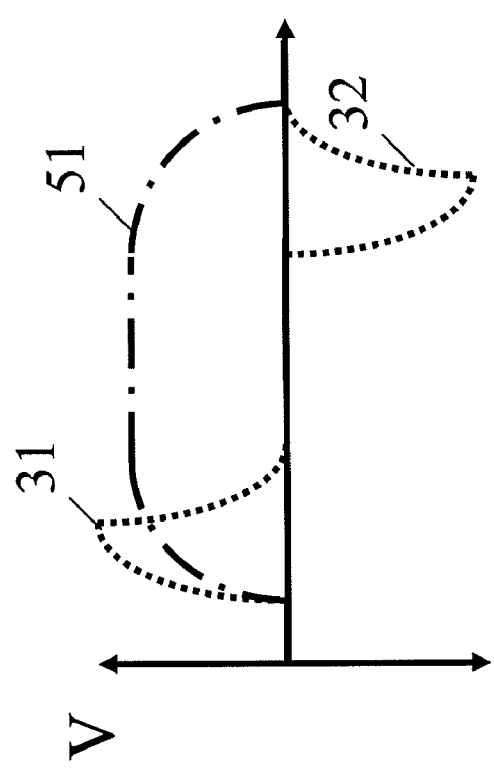
FIG. 5A is a waveform diagram illustrating an exemplary waveform of an output from an integrator illustrated in FIG. 4B.
Figure 5B:
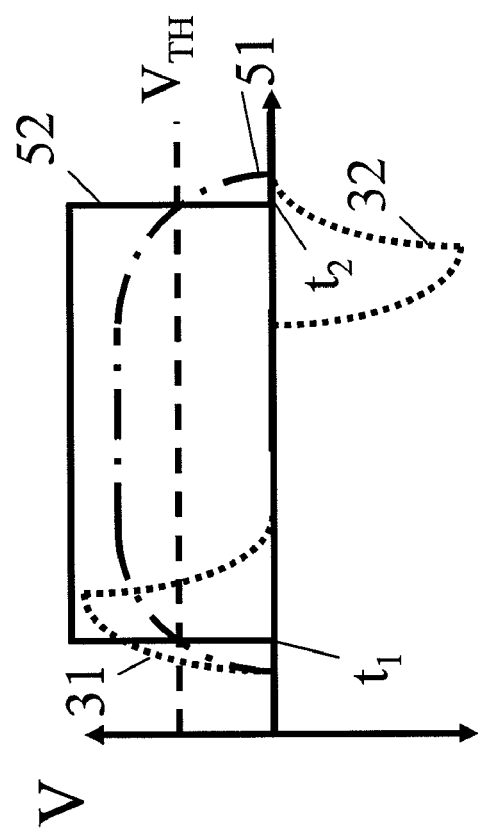
FIG. 5B is a waveform diagram illustrating an exemplary waveform of an output from a digitizer illustrated in FIG. 4B.

FIG. 4A is a block diagram illustrating a force sensor module 40 according to yet another example of the present invention. Referring to FIG. 4A, the force sensor module 40 may include an integrator 44 and a digitizer 46 in addition to the pre-amplifier 22. The integrator 44 may be configured to integrate an amplified electrical signal from the pre-amplifier 22 and generate an integrated signal 51 as illustrated in FIG. 5A. Furthermore, the digitizer 46 may be configured to convert the integrated signal 51 generated by the integrator 44 into a digitized force sensing result. Based on the integrated signal 51 from the integrator 44, the digitizer 46 may generate an output 52 as illustrated in FIG. 5B. Referring to FIG. 5B, the digitizer 46 may be configured to compare the integrated signal 51 with a threshold $V_{TH}$. The output 52 from the digitizer 46 may have a square-wave shape and may include an active period from $t_1$ to $t_2$, during which the integrated signal 51 has a level greater than or equal to the threshold $V_{TH}$.

Figure 4B:
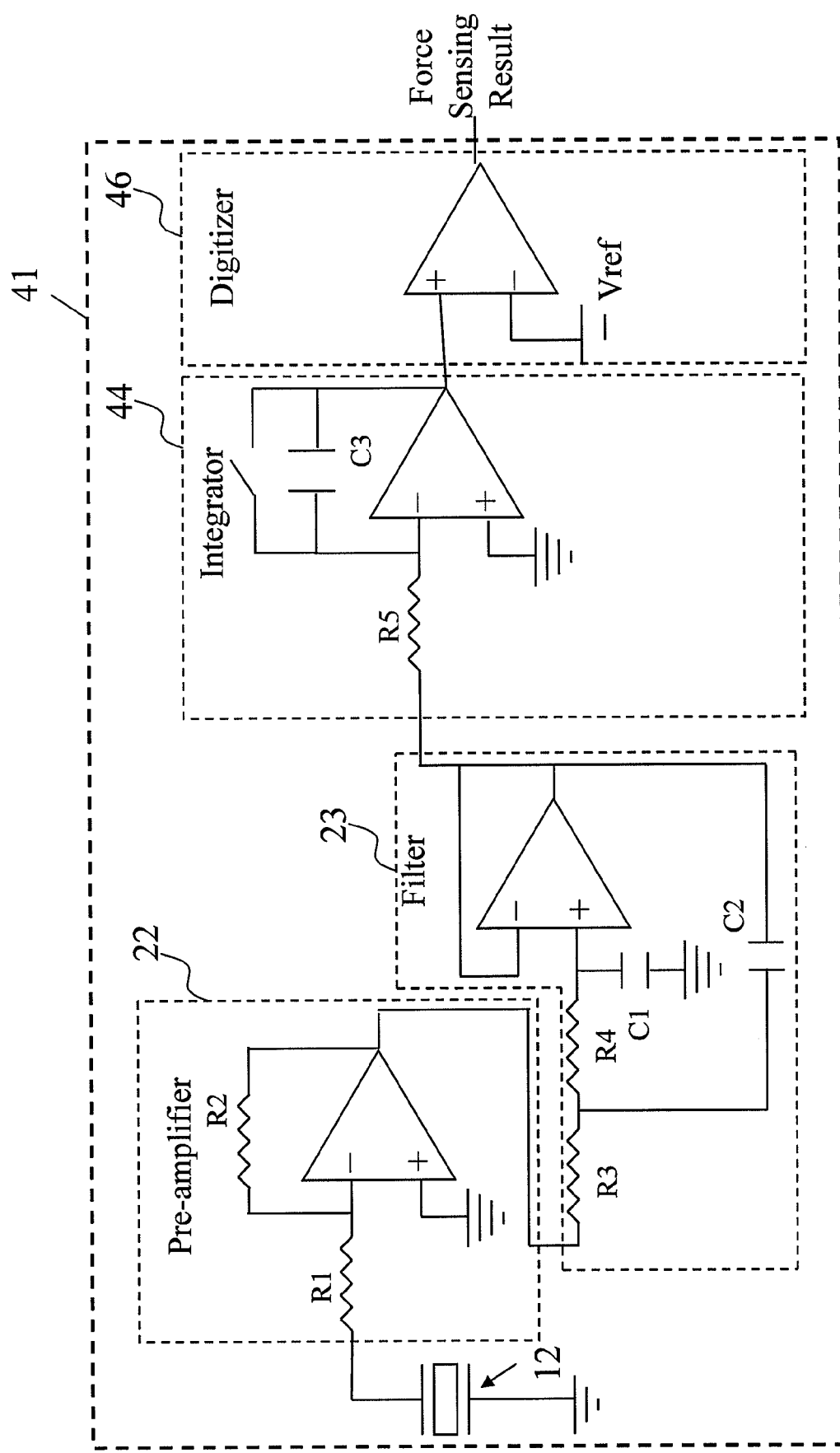
FIG. 4B is a circuit diagram illustrating a force sensor module according to still another example of the present invention.

FIG. 4B is a circuit diagram illustrating a force sensor module 41 according to still another example of the present invention. Referring to FIG. 4B, the force sensor module 41 may be similar to the force sensor module 40 described and illustrated with reference to FIG. 4A except that, for example, the force sensor module 41 may further include the filter 23. In the present example, the pre-amplifier 22, the filter 23, the integrator 44 and the digitizer 46 may each include at least one operating amplifier.

Figure 6A:
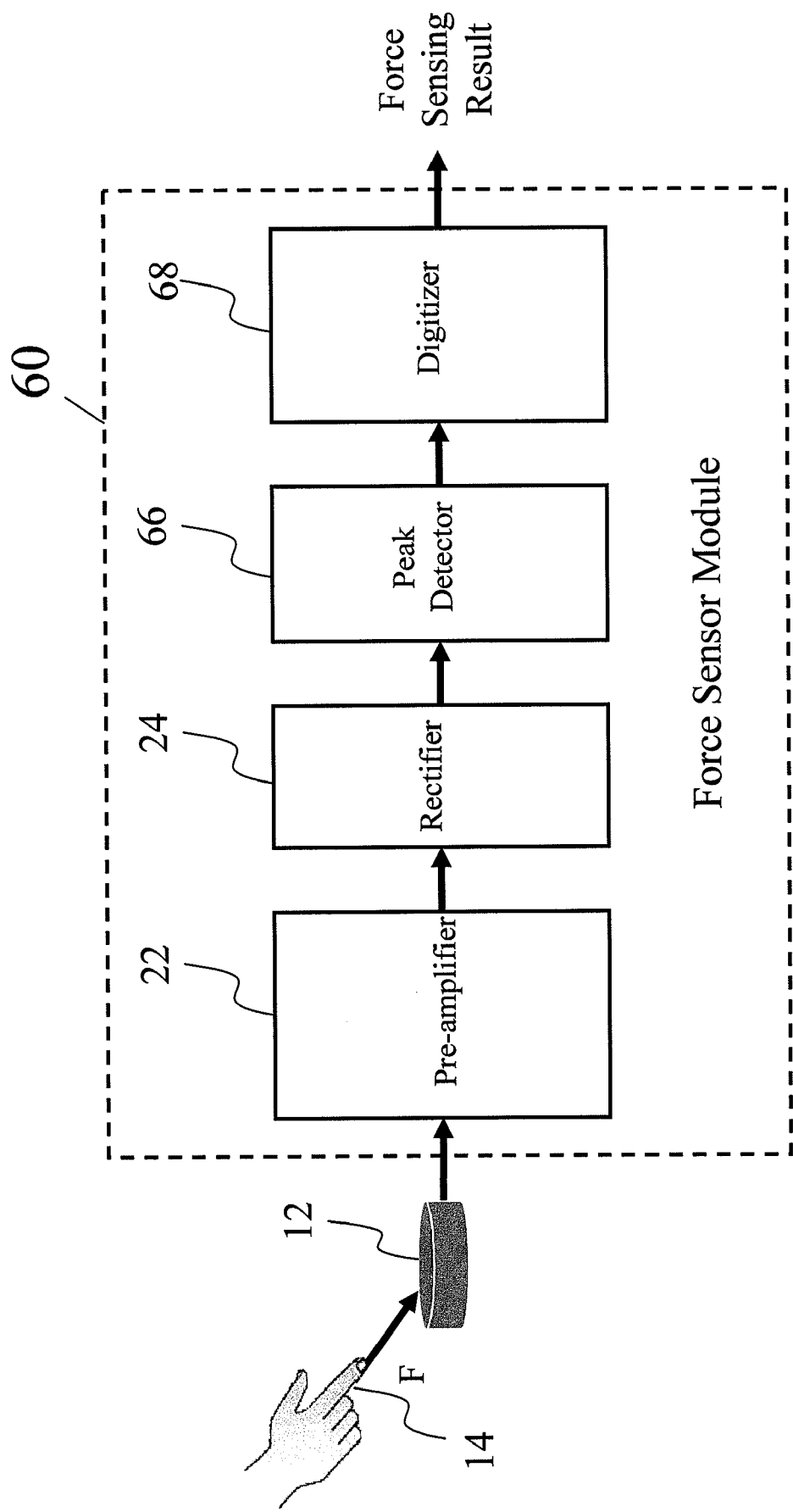
FIG. 6A is a block diagram illustrating a force sensor module according to yet still another example of the present invention.

FIG. 6A is a block diagram illustrating a force sensor module 60 according to yet still another example of the present invention. Referring to FIG. 6A, the force sensor module 60 may include a peak detector 66 and a digitizer 68 in addition to the pre-amplifier 22 and the rectifier 24. The peak detector 66 may be configured to detect peak signal(s) of the rectified signal from the rectifier 24 and feed the detected peak signal(s) into the digitizer 68, which in turn may convert the detected peak signal(s) into a digitized force sensing result.

Figure 6B:
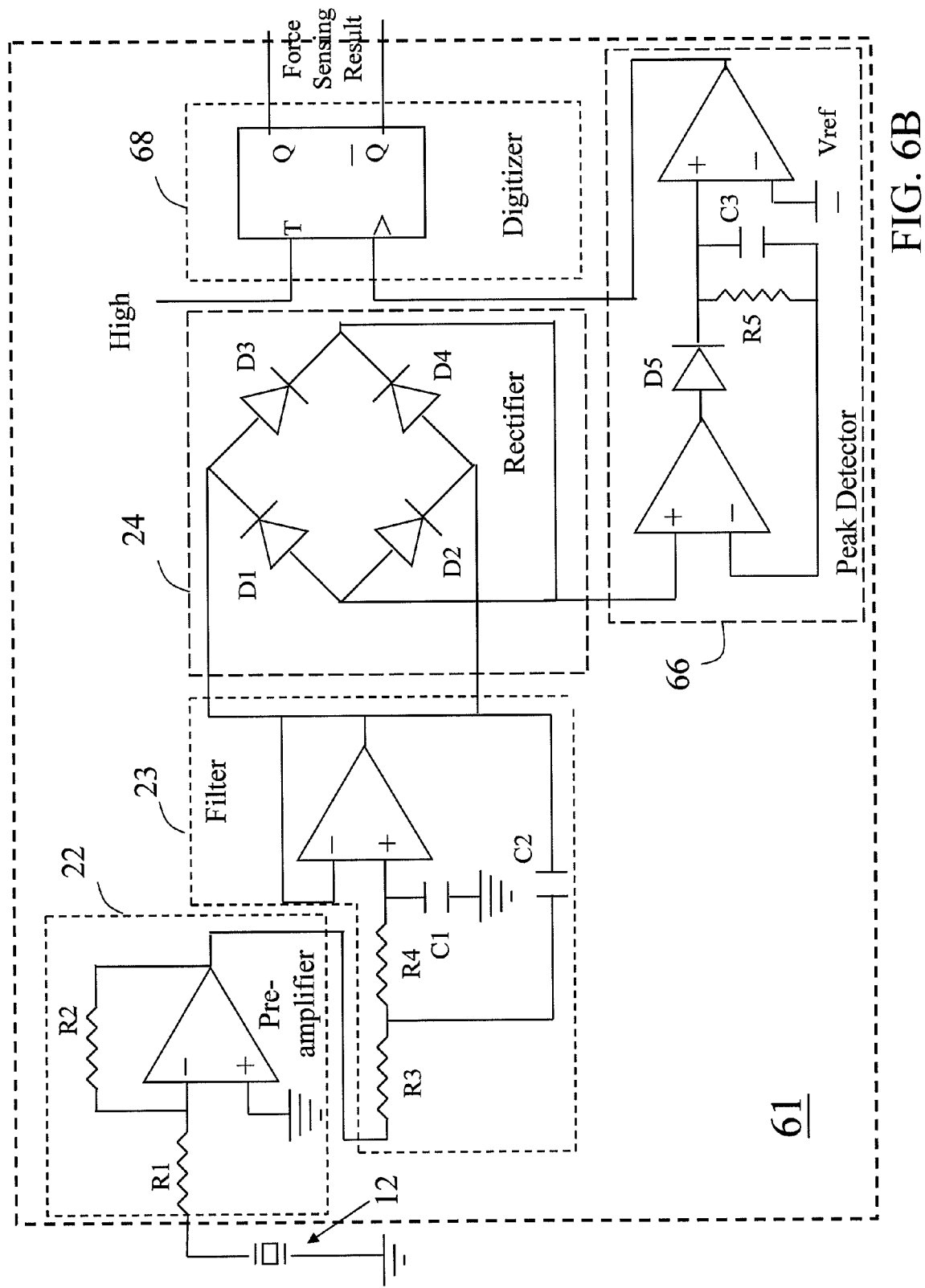
FIG. 6B is a circuit diagram illustrating a force sensor module according to yet another example of the present invention.

FIG. 6B is a circuit diagram illustrating a force sensor module 61 according to yet another example of the present invention. Referring to FIG. 6B, the force sensor module 61 may be similar to the force sensor module 60 described and illustrated with reference to FIG. 6A except that, for example, the force sensor module 61 may further include the filter 23. Moreover, in the present example, the peak detector 66 may include at least one operating amplifier.

Figure 7A:
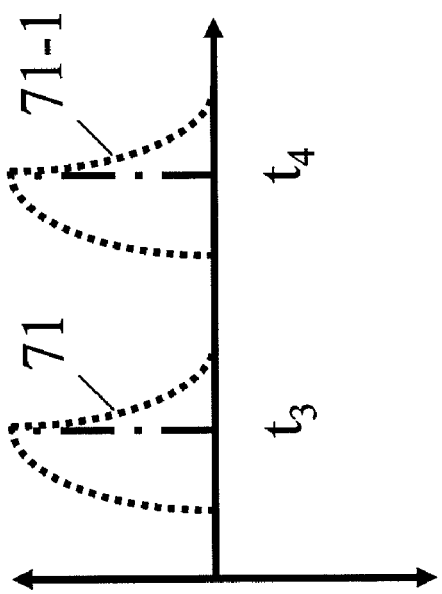
FIG. 7A is a diagram illustrating exemplary peak signals from a peak detector illustrated in FIG. 6B.
Figure 7B:
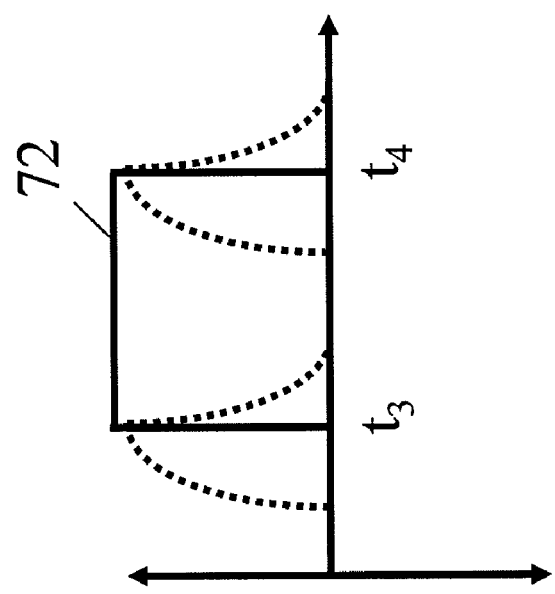
FIG. 7B is a waveform diagram illustrating an exemplary waveform of an output from a digitizer illustrated in FIG. 6B.

FIG. 7A is a diagram illustrating exemplary peak signals from the peak detector 66. Referring to FIG. 7A, peak values of a first half 71 and a second half 71-1 of a rectified signal from the rectifier 24 may be detected at time points $t_3$ and $t_4$, respectively. Based on the peak signals at $t_3$ and $t_4$, the digitizer 68 may generate an output 72 as illustrated in FIG. 7B. Referring to FIG. 7B, the output 72 from the digitizer 68 may have a square-wave shape and may include an active period from $t_3$ to $t_4$.

Figure 8A:
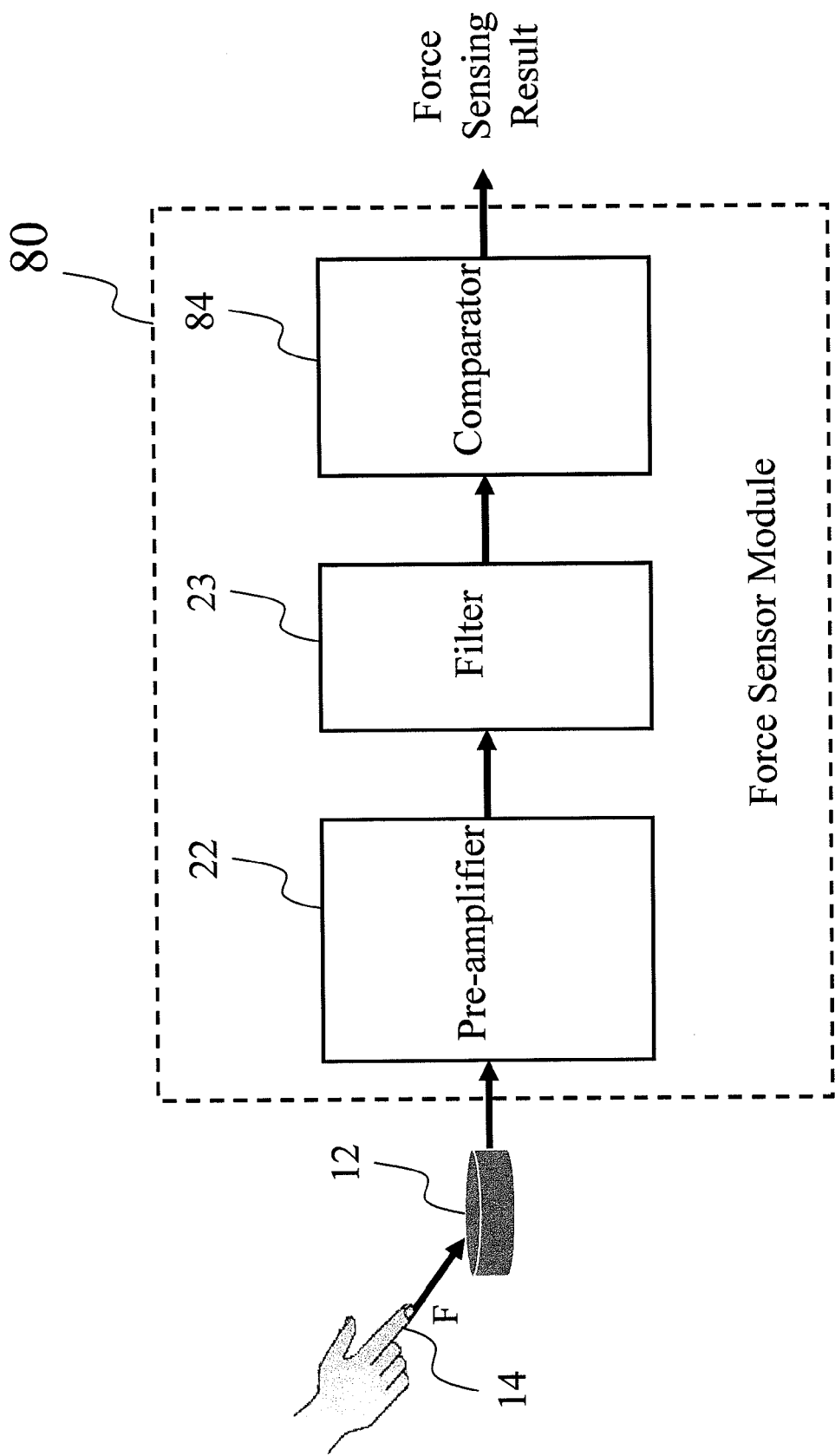
FIG. 8A is a block diagram illustrating a force sensor module according to still another example of the present invention.

FIG. 8A is a block diagram illustrating a force sensor module 80 according to still another example of the present invention. Referring to FIG. 8A, the force sensor module 80 may include a comparator 84 in addition to the pre-amplifier 22 and the filter 23. The comparator 84 may be configured to compared a filtered signal from the filter 23 with a threshold. If the filtered signal is greater than or equal to the threshold, the comparator 84 may generate a force sensing result to indicate that a force applied to the light sensitive screen 10 is significant and the light sensitive screen 10 is actually touched. In one example, the electrical signal from the sensing element 12 may be processed at the filter 23 prior to the pre-amplifier 22. In another example, the threshold of the comparator 84 may be changeable to suit different applications. In still another example, the comparator 84 may compare the filtered signal with at least one threshold, and may be configured to generate a first force sensing result related to a touch status and a second force sensing result related to, for example, the magnitude of a force applied to the light sensitive screen 10.

Figure 8B:
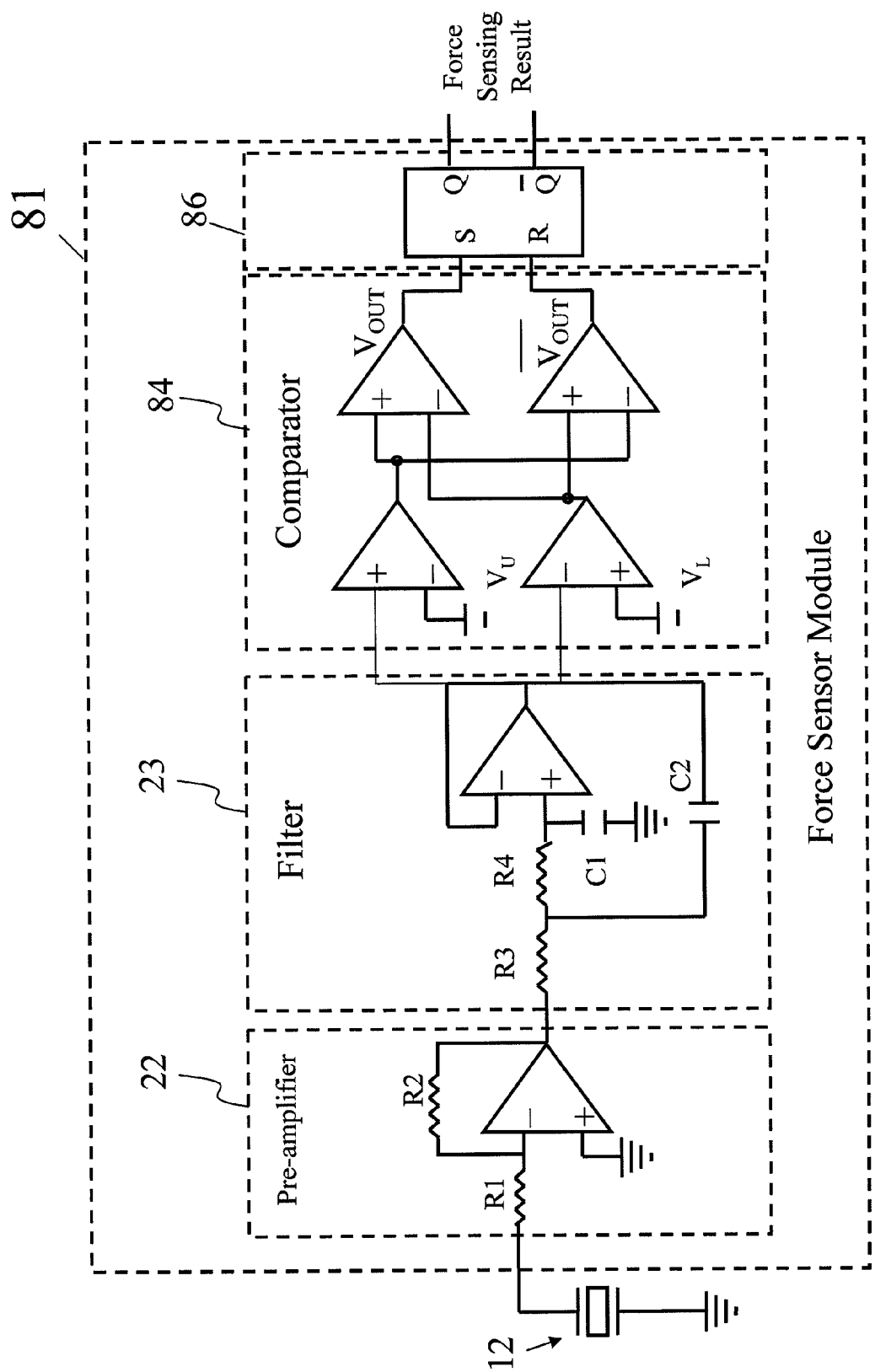
FIG. 8B is a circuit diagram illustrating a force sensor module according to yet another example of the present invention.

FIG. 8B is a circuit diagram illustrating a force sensor module 81 according to yet another example of the present invention. Referring to FIG. 8B, the force sensor module 81 may be similar to the force sensor module 80 described and illustrated with reference to FIG. 8A except that, for example, the force sensor module 81 may further include a digitizer 86, which may be configured to convert a force result signal from the comparator 84 into a digitized force sensing result. In the present example, the comparator 84 may include at least one operating amplifier, and the digitizer 86 may include an SR latch or SR flip-flop including a setting input "S" and a reset input "R".

FIG. 9A is a waveform diagram illustrating exemplary waveforms of an input force and an amplified electrical signal, wherein the input force applied to a screen from a force source and an electrical signal generated by the sensing element 12 may be similar to those described and illustrated with reference to FIG. 3A.

FIGS. 9B and 9C are waveform diagrams illustrating exemplary waveforms of output voltages of the comparator 84 illustrated in FIG. 8B. Referring to FIGS. 9B and 9C, based on the amplified electrical signal, a pair of output voltages $V_{OUT}$ (FIG. 9B) and $\overline{V_{OUT}}$ (FIG. 9C) may be generated by the comparator 84. The pair of output voltages $V_{OUT}$ and $\overline{V_{OUT}}$ may have substantially the same amplitude but 180 degrees out of phase with one another. In one example, if the first half 31 has a level equal to or greater than an upper threshold $V_U$, then $V_{OUT}$ for the first half 31 is positive while $\overline{V_{OUT}}$ for the first half is negative, and vice versa. Likewise, if the second half 32 has a level smaller than a lower threshold $V_L$, or has a level greater than the lower threshold $V_L$ in absolute value, $V_{OUT}$ for the second half 32 is negative while $\overline{V_{OUT}}$ for the second half 32 is positive, and vice versa. The upper threshold $V_U$ and the lower threshold $V_L$ may have substantially the same value with different signs.

FIG. 9D is a waveform diagram illustrating an exemplary waveform 90 of the force sensing result generated from the digitizer 86 illustrated in FIG. 8B. Referring to FIG. 9D, $V_{OUT}$ and $\overline{V_{OUT}}$ from the comparator 84 are fed to the set "S" and reset "R" inputs of the SR latch of the digitizer 86, respectively. The digitizer 86 may generate the output 90 based on the values of $V_{OUT}$ and $\overline{V_{OUT}}$. In the present example, the output 90 may have a square-wave shape and may include an active period spanning from the setting till the reset of the digitizer 86. The active period of the output 90, which may refer to a logic "1" period, may represent a period that the input force is applied to a screen. Accordingly, the force sensor module 81 described and illustrated with reference to FIG. 8B may function like a switch to allow or reject an input to the screen based on the magnitude of an input force.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

That which is claimed is:

1. A light sensitive screen comprising:
   at least one sensing element each being configured to detect a force applied to a position of the light sensitive screen and generate an electrical signal when a force is detected, the electrical signal including a positive half and a negative half; and
   a sensor module configured to receive and process the electrical signal from the at least one sensing element, the sensor module comprising:
   an amplifier configured to amplify the electrical signal from one of the at least one sensing element and generate an amplified signal;
   a comparator configured to compare one of the positive half and the negative half with a threshold and generate a first voltage signal and a second voltage signal, the first voltage signal and the second voltage having the same amplitude with different signs; and
   a digitizer configured to generate a digital signal based on the first voltage signal and the second voltage signal, the digital signal including information as to whether the position of the light sensitive screen is touched.

2. The light sensitive screen of claim 1, wherein each of the at least one sensing element includes one of a piezoelectric element or a piezoresistive element.

3. The light sensitive screen of claim 1, wherein the amplifier includes a pre-amplifier and a filter.

4. The light sensitive screen of claim 1, wherein the comparator compares a positive half of the amplified signal with a first threshold and compares a negative half of the amplified signal with a second threshold.

5. The light sensitive screen of claim 1, wherein the digitizer includes an SR latch further including a first input to receive one of the first voltage signal and the second voltage signal, and a second input to receive the other one of the first voltage signal and the second voltage signal.

6. The light sensitive screen of claim 5, wherein the digital signal includes an active period from a setting time point till a reset time point of the SR latch.

\* \* \* \* \*